June 10, 1924.
A. SOLOSABAL
1,496,789
SUPPORTING BRACKET FOR HEADLIGHTS
Filed June 19, 1922
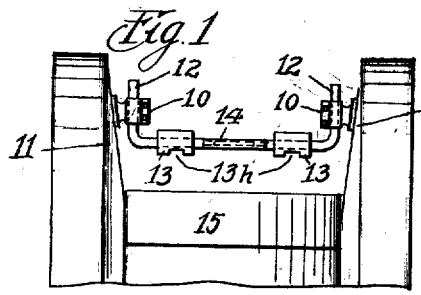
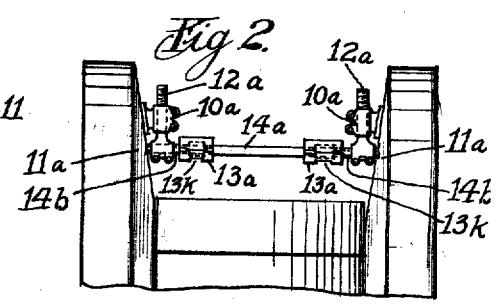
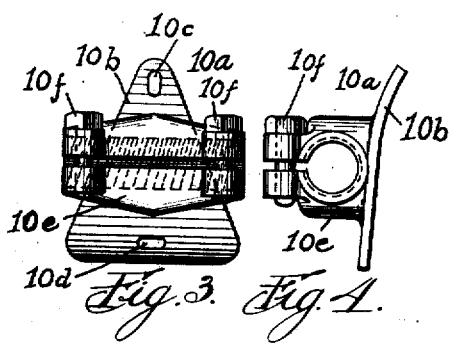
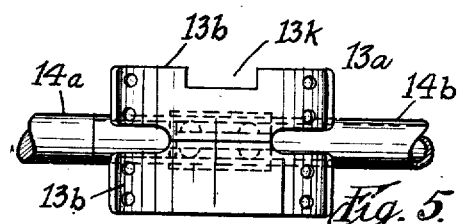
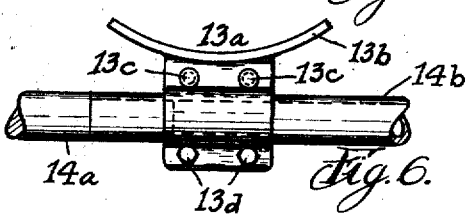
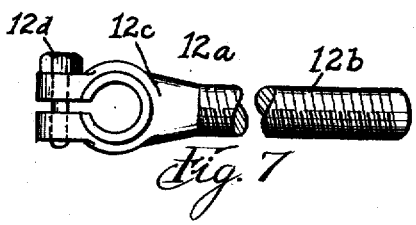
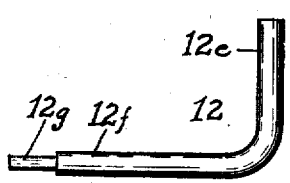
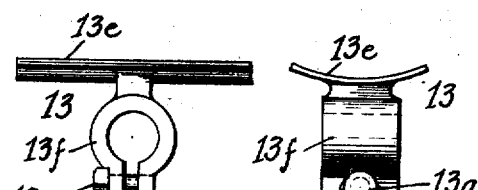
INVENTOR.
ANDRES SOLOSABAL
BY Albert E. Bell
ATTORNEY.

Patented June 10, 1924.

1,496,789

UNITED STATES PATENT OFFICE.

ANDRES SOLOSABAL, OF BOISE, IDAHO.

SUPPORTING BRACKET FOR HEADLIGHTS.

Application filed June 19, 1922. Serial No. 569,289.

*To all whom it may concern:*

Be it known that I, ANDRES SOLOSABAL, a citizen of the United States, residing at Boise, in the county of Ada and State of Idaho, have invented a new and useful Improvement in Supporting Brackets for Headlights, of which the following is a specification.

My invention relates to an improved form of supporting bracket for headlights, designed particularly for use in connection with automobiles and motor vehicles. The construction includes a rigid supporting member on each side of the vehicle between which a cross bar extends in front of the front end of the body portion of the vehicle, to support additional members provided to be secured to the casings of the headlights, the parts being so related that the headlight mounting members may be moved for purposes of adjustment, either laterally of the vehicle or angularly on the cross bar and that the cross bar may be moved longitudinally of the vehicle in the fixed supports, as may be required to give the headlight proper adjustment.

My invention will best be understood by reference to the accompanying drawings showing preferred embodiments thereof, in which—

Fig. 1 shows in plan view the front end of a motor vehicle with the preferred form of my supporting bracket in place, Fig. 2 shows in a view similar to Fig. 1 a modified construction of supporting bracket, Figs. 3 and 4 are respectively side and end elevations of the fixed support used at each end of the bracket to support the cross bar, Figs. 5 and 6 are top and side views respectively of one form of headlight mounting member for use as a part of my bracket construction, Fig. 7 shows in side elevation a connecting stud clamp for use with the construction shown in Fig. 2, Fig. 8 is a detail view of a bent bar constituting a part of the cross bar construction shown in Fig. 1 and Figs. 9 and 10 are end and side elevations respectively of the form of headlight mounting members shown in Fig. 1.

Similar numerals refer to similar parts throughout the several views.

As shown in Fig. 1 my supporting bracket consists of two fixed supports 10, 10 rigidly secured by suitable means such as rivets, screws or bolts, not shown, to the front portions of the vertical walls of the front fenders 11, 11 of the vehicle. The supports 10, 10 receive the ends of the bent bars 12 extending longitudinally of the vehicle and upon the laterally extending ends of these bars the lamp mounting members 13, 13 are secured, the projecting ends of the bars being connected by a tube 14 tightly fitting them. The headlight mounting members 13, 13 are provided with clamping devices in a manner described below and as a result either of these members may be moved laterally of the vehicle on the cross bar or angularly thereon as required to place the headlights in proper adjustment and the cross bar may be moved as a whole with the headlight supporting members and attached headlights, longitudinally of the vehicle in the fixed supports 10, 10 to give the headlights the desired relation relatively to the radiator 15 of the vehicle.

In the construction shown in Fig. 2 the fixed supports 10$^a$, 10$^a$ are similar to the supports 10 shown in Fig. 1 and are similarly secured to the fenders 11$^a$, 11$^a$, the supports 10$^a$ differing only in that they are threaded to receive the threaded stud clamps 12$^a$, 12$^a$. The clamping end of each of the stud clamps 12$^a$, 12$^a$ has extending through it a metal tube 14$^b$ upon which is mounted one of the headlight supporting members 13$^a$, 13$^a$, the clamping portions of the stud clamps serving to hold the tubes 14$^b$ rigidly in any desired adjustment, and the members 13$^a$, 13$^a$ being provided as described below with clamping devices tightly engaging the tubes 14$^b$ to secure said members in any desired lateral or angular adjustment. The cross bar construction is completed by a rod 14$^a$ extending between the ends of the tubes 14$^b$, 14$^b$ and tightly engaging the same. The cross bar and parts carried thereby may be given any desired adjustment longitudinally of the vehicle by turning the stud clamps in the fixed supports 10$^a$, 10$^a$ and in any desired adjustment, the stud clamps may be securely held by the clamps forming a part of the fixed supports 10$^a$, 10$^a$.

As shown in Figs. 3 and 4 the fixed supports 10$^a$ shown in Fig. 2, are each provided with a mounting plate 10$^b$ of a conformation to engage the inner vertical surface of the forward portion of the fender, said plate having upper and lower slotted openings $10^c$ and $10^d$ through it to receive suitable fastening devices for securing the support to the fender. The mid portion of the plate has an enlarged boss $10^e$ extending from it provided with a threaded bore for receiving the threaded end of the stud clamp, and said boss is provided with a slot at one side extending into said bore and suitable clamping screws $10^f$ extending through the slotted portion of the boss to securely clamp the boss on the stud clamp for any desired adjustment of the stud clamp. Each of the fixed supports 10, 10 shown in Fig. 1 is of the same construction as the fixed support just described, with the exception that the bore in the boss is not threaded and in either case the fixed support is preferably made from cast metal.

As shown in Fig. 7 each stud clamp $12^a$ consists of a cylindrical threaded portion $12^b$ for engaging the threaded bore in one of the fixed supports $10^a$, $10^a$ which cylindrical portion at one end is enlarged to form a boss $12^c$ having a bore for receiving one end of a short tube $14^b$ and this boss is slotted at one side into said bore and provided with clamping screws or bolts $12^d$ by which the tube $14^b$ may be securely held in desired position in the stud clamp. If desired the threads on the portion $12^b$ may be omitted and plain bores may be employed in the supports $10^a$ to receive the stud clamps.

As shown in Figs. 5 and 6, each headlight supporting member $13^a$ is made preferably from sheet metal formed as indicated in two parts, the upper portions of these parts as indicated at $13^b$, $13^b$ having a cylindrical conformation to engage the under surface of the headlight casing, to which the member may be secured by suitable bolts or rivets extending through the holes indicated in the cylindrical portions $13^b$, $13^b$. The two portions of each of said members are preferably securely held together by rivets or bolts $13^c$ extending through portions of the two parts of the member extending vertically downwards from the cylindrical portions mentioned, adjacent each other, and below the rivets or bolts $13^c$ these vertically extending parts are bent outwardly in cylindrical form to receive between them, one of the short metal tubes $14^b$. The vertically extending portions of the support are continued beyond the tube $14^b$ and at a distance from each other, so that clamping screws or bolts $13^d$ extending through the lower ends of said member may securely clamp said member to said tube and thus hold said member in any position angularly or laterally upon the tube in which it is desired to hold said member to give proper adjustment to the headlight carried thereby.

The rear edge of the upper portion of each of the members 13 as indicated at $13^b$ and of each of the members $13^a$ as indicated at $13^k$, is notched to provide a clearance for a vertical operating rod where the headlight to be mounted on said member is of the dirigible type having a part thereof movable and an operating rod extending downwardly from said headlight to operate said movable part.

The rod 12 shown in Fig. 8 constituting a part of the cross bar structure shown in Fig. 1 consists of a first portion $12^e$ to be engaged by the clamp of one of the fixed supports 10 and a second portion $12^f$ extending at substantially right angles from the portion $12^e$ to support one of the headlight supporting members 13, 13. The end of the portion $12^f$ is made of reduced diameter as indicated at $12^g$ to receive one end of a metal tube 14 which preferably is of substantially the same external diameter as the diameter of the rod 12. The portions $12^g$ of the rods 12 are preferably tight fits in the tube 14 so that when the parts are in the position indicated in Fig. 1 a rigid supporting structure is afforded for the headlights carried by the members 13, 13.

The supporting member 13 shown in Figs. 9 and 10 consists preferably of a metal casting having an upper cylindrical portion $13^e$ forming a seat for receiving the casing of the headlight, to which said casing may be secured by suitable screws or bolts not shown, extending through said cylindrical portion. From the mid portion of the cylindrical portion a boss $13^f$ extends downwardly which is provided with a bore for receiving the portion $12^f$ of one of the rods 12, said boss having a slot extending through one side into said bore and provided with one or more clamping screws or bolts $13^g$ for securely clamping the supporting member to the rod 12.

In connection with either construction described, the advantage of making the cross bar in several parts is to more readily permit the assembling and adjustment of the parts.

From the above it will be observed that my improved headlight supporting bracket affords a rigid support for the headlights, as a result of the manner of connecting the cross bar with the fixed supports on the two sides of the vehicle; also that the fixed supports are secured to the side walls of the front fenders near their front ends, where the operation of securing them to the fenders may readily be performed and that the construction of the supporting devices permits the headlights to be mounted somewhat to the rear of the fixed supports if desired, and in desired relation to the radiator or front end of the motor vehicle and furthermore that adjustment may be given the headlights in any desired direction after the headlights are mounted in place and the supporting mechanism is secured to the motor vehicle. It will be also observed that besides being conveniently adjustable and of rigid construction, my headlight supporting mechanism is of simple construction and inexpensive to manufacture.

It will be understood that while I have shown certain types of devices for fastening the parts together and for clamping one part of the structure to another part thereof that I do not limit myself to the use only of these specific devices, as for example in connection with each of the clamping devices, either screws or bolts may be used as preferred and furthermore in connection with each of said clamping devices either one clamping screw or bolt may be employed as indicated in Figs. 9 and 10 or two or more clamping screws or bolts may be employed as indicated in Figs. 3 and 4 depending upon the particular construction in any case and also upon the weight of the headlights to be supported by the mechanism. It will be also understood that the fixed supports and the headlight supporting members may be made of various sizes and shapes depending upon the shape of the fenders and the shape of the headlight casings. I do not therefore limit myself in carrying out my invention to the exact construction shown and described as I may employ equivalents thereof known to the art at the time of the filing of this application without departing from the scope of the appended claims.

What I claim is:

1. In a structure of the class described, the combination of a bracket adapted to be secured to the front portion of each front fender of a motor vehicle, each of said brackets having an opening therethrough to receive a supporting rod, a cross bar for support by said brackets when in place on said fenders to extend across the front end of the vehicle and comprising two longitudinally extending end members disposed in the openings through said brackets and a laterally extending portion between said end members, and mounting members for support on said laterally extending portion each comprising a flange part to be secured to the casing of a headlight and a vertically extending portion having an opening therethrough to receive said laterally extending portion, the vertically extending portion of each of said mounting members including a clamp for securing said mounting member against movement on said laterally extending member, and each of said brackets including a clamp for securing said bracket to said end member to prevent motion of said end member in said bracket, said end members and said laterally extending portion having connections securing them together whereby said cross bar constitutes a rigid support for the headlights, and said connections being separable to permit ready assembling of the parts of the structure.

2. In a structure of the class described, the combination of a bracket adapted to be secured to the front portion of each front fender of a motor vehicle, each of said brackets having an opening therethrough to receive a supporting rod, a cross bar for support by said brackets when in place on said fenders to extend across the front end of the vehicle and comprising two longitudinally extending end members disposed in the openings through said brackets and a laterally extending portion between said end members, mounting members for support on said laterally extending portion each comprising a flange part to be secured to the casing of a headlight and a vertically extending portion having an opening therethrough to receive said laterally extending portion, devices for securing said mounting members in desired position on said laterally extending member, and devices for securing said brackets in desired adjustment to said end members, said end members and said laterally extending portion having connections securing them together whereby said cross bar constitutes a rigid support for the headlights, and said connections being separable to permit ready assembling of the parts of the structure.

3. In a structure of the class described, the combination of a bracket adapted to be secured to the front portion of each front fender of a motor vehicle, each of said brackets having an opening therethrough to receive a supporting rod, a cross bar for support by said brackets when in place on said fenders to extend across the front end of the vehicle and comprising two longitudinally extending end members disposed in the openings through said brackets and a laterally extending portion between said end members, and mounting members for support on said laterally extending portion each comprising a flange part to be secured to the casing of a headlight and a vertically extending portion having an opening therethrough to receive said laterally extending portion, the vertically extending portion of each of said mounting members including a clamp for securing said mounting member against movement on said laterally extending member, and each of said brackets including a clamp for securing said bracket to said end member to prevent motion of said end member in said bracket.

4. In a structure of the class described, the combination of a bracket adapted to be secured to the front portion of each front fender of a motor vehicle, each of said brackets having an opening therethrough to receive a supporting rod, a cross bar for support by said brackets when in place on said fenders to extend across the front end of the vehicle and comprising two longitudinally extending end members disposed in the openings through said brackets and a laterally extending portion between said end members, mounting members for support on said laterally extending portion each comprising a flange part to be secured to the casing of a headlight and a vertically extending portion having an opening therethrough to receive said laterally extending portion, devices for securing said mounting members in desired position on said laterally extending member, and devices for securing said brackets in desired adjustment to said end members.

5. In a structure of the class described, the combination of a bracket adapted to be secured to the front portion of each front fender of a motor vehicle, each of said brackets comprising a metal casting having a flange plate for attachment to a fender and a boss having a bore for receiving a rod to be supported by said bracket, said boss being slotted into said bore and having clamping screws extending through its slotted portion, a bent rod having two portions extending longitudinally and laterally of the vehicle for each of said brackets, the longitudinally extending portion of each of said rods extending through the bore of one of said brackets, a mounting member for supporting a headlight from each of said rods, each of said mounting members comprising a flange plate to be secured to a headlight and a boss having a bore for receiving the laterally extending portion of one of said rods, said last named boss being slotted into said bore and having clamping screws extending through its slotted portion, and a cross member extending between said rods to hold them in supporting position.

6. In a structure of the class described, the combination of a bracket adapted to be secured to the front portion of each front fender of a motor vehicle, each of said brackets comprising a metal casting having a flange plate for attachment to a fender and a boss having a bore for receiving a rod to be supported by said bracket, said boss being slotted into said bore and having clamping screws extending through its slotted portion, a bent rod having two portions extending longitudinally and laterally of the vehicle for each of said brackets, the longitudinally extending portion of each of said rods extending through the bore of one of said brackets, a mounting member for supporting a headlight from each of said rods, each of said mounting members comprising a flange plate to be secured to a headlight and a boss having a bore for receiving the laterally extending portion of one of said rods, said last named boss being slotted into said bore and having clamping screws extending through its slotted portion, and a cross member extending between said rods to hold them in supporting position, said cross member comprising a tube of substantially the same external diameter as the diameter of said rods and said rods having ends of reduced diameter entering and fitting the ends of said tube.

In witness whereof, I hereunto subscribe my name this 6th day of June, A. D. 1922.

ANDRES SOLOSABAL.